United States Patent
Banks (10) Patent No.: US 11,288,656 B1
(45) Date of Patent: Mar. 29, 2022

(54) SYSTEMS AND METHODS FOR CLOUD-BASED ASYNCHRONOUS COMMUNICATION

(71) Applicant: Worldpay, LLC, Symmes Township, OH (US)

(72) Inventor: Walter Banks, Chandler, AZ (US)

(73) Assignee: Worldpay, LLC, Symmes Township, OH (US)

( * ) Notice: Subject to any disclaimer, the term of this patent is extended or adjusted under 35 U.S.C. 154(b) by 364 days.

(21) Appl. No.: 16/226,028

(22) Filed: Dec. 19, 2018

(51) Int. Cl.
*G06Q 20/32* (2012.01)
*G06Q 20/40* (2012.01)
*G06Q 20/20* (2012.01)

(52) U.S. Cl.
CPC ......... *G06Q 20/325* (2013.01); *G06Q 20/206* (2013.01); *G06Q 20/4012* (2013.01)

(58) Field of Classification Search
CPC ............... G06Q 20/325; G06Q 20/206; G06Q 20/4012; G06Q 30/0281
See application file for complete search history.

(56) References Cited

U.S. PATENT DOCUMENTS

| | | | | |
|---|---|---|---|---|
| 6,065,679 | A * | 5/2000 | Levie | G06Q 20/343 235/462.47 |
| 10,614,021 | B1 * | 4/2020 | Banks | H04L 67/2828 |
| 10,681,185 | B1 * | 6/2020 | Banks | G06Q 30/06 |
| 2004/0139148 | A1 * | 7/2004 | Norton | H04L 51/063 709/200 |
| 2005/0111631 | A1 * | 5/2005 | Jordan | H04L 51/066 379/88.12 |
| 2005/0250538 | A1 * | 11/2005 | Narasimhan | G07F 7/0886 455/558 |
| 2009/0040923 | A1 * | 2/2009 | Bantukul | H04L 41/06 370/230 |
| 2009/0177617 | A1 * | 7/2009 | Lee | H04L 51/00 |
| 2010/0131764 | A1 * | 5/2010 | Goh | H04L 9/321 713/171 |
| 2011/0161681 | A1 * | 6/2011 | Dhuse | G06F 11/1443 713/193 |
| 2018/0260897 | A1 * | 9/2018 | Olsson | G06Q 40/04 |
| 2019/0005499 | A1 * | 1/2019 | Wall | G06Q 20/4012 |
| 2019/0034381 | A1 * | 1/2019 | Burstein | H04L 67/1097 |

* cited by examiner

*Primary Examiner* — Johann Y Choo
(74) *Attorney, Agent, or Firm* — Bookoff McAndrews, PLLC (57) ABSTRACT

A method for cloud-based asynchronous communication includes receiving a transaction request message from a cloud-based application, sending the received transaction request message to a PIN pad by way of an electronic message repository, updating a current state according to the received transaction request, listening for a new incoming message event from the electronic message repository, receiving a new incoming message event from the electronic message repository, and retrieving an incoming message from the electronic message repository, determining whether the retrieved incoming message matches the current state, upon determining that the retrieved incoming message matches the current state, transmitting the retrieved incoming message to the cloud-based application, and upon determining that the retrieved incoming message does not match the current state, retaining the retrieved incoming message in the electronic message repository.

14 Claims, 9 Drawing Sheets

SYSTEMS AND METHODS FOR CLOUD-BASED ASYNCHRONOUS COMMUNICATION

TECHNICAL FIELD

Various embodiments of the present disclosure relate generally to an electronic payment infrastructure and, more particularly, to cloud-based asynchronous communication between components of an electronic payment infrastructure.

BACKGROUND

Traditionally, merchants and other store owners have point of sale (POS) terminals and POS systems that can accept check or payment card payments from consumers for goods and services. Such POS systems may include PIN pads at which a consumer may enter payment and/or personal information in order to complete payment processing requests for purchases. Communication between a POS terminal, a PIN Pad, and other components of the merchant's payment processing system may involve transmitting messages according to different protocols and via different application programming interfaces (APIs). Such communication is traditionally conducted synchronously between a PIN pad and a POS terminal. In such a synchronous communication system, once a message has been transmitted to the PIN pad the POS terminal has to wait for the response, which reduces the efficiency of the system because resources are busy waiting for messages. Furthermore, errors are introduced when out of sequence messages arrive because the system is limited to known request/response pairs.

The present disclosure is directed to overcoming one or more of these above-referenced challenges.

SUMMARY OF THE DISCLOSURE

According to certain aspects of the present disclosure, systems and methods are disclosed for cloud-based asynchronous communication.

In one embodiment, a computer-implemented method is disclosed for cloud-based asynchronous communication, the method comprising: receiving a transaction request message from a cloud-based application, sending the received transaction request message to a PIN pad by way of an electronic message repository, updating a current state according to the received transaction request, listening for a new incoming message event from the electronic message repository, receiving a new incoming message event from the electronic message repository, and retrieving an incoming message from the electronic message repository, determining whether the retrieved incoming message matches the current state, upon determining that the retrieved incoming message matches the current state, transmitting the retrieved incoming message to the cloud-based application, and upon determining that the retrieved incoming message does not match the current state, retaining the retrieved incoming message in the electronic message repository.

In accordance with another embodiment, a non-transitory machine-readable medium storing instructions that, when executed by the a computing system, causes the computing system to perform a method for cloud-based asynchronous communication, the method including: receiving a transaction request message from a cloud-based application, sending the received transaction request message to a PIN pad by way of an electronic message repository, updating a current state according to the received transaction request, listening for a new incoming message event from the electronic message repository, receiving a new incoming message event from the electronic message repository, and retrieving an incoming message from the electronic message repository, determining whether the retrieved incoming message matches the current state, upon determining that the retrieved incoming message matches the current state, transmitting the retrieved incoming message to the cloud-based application, and upon determining that the retrieved incoming message does not match the current state, retaining the retrieved incoming message in the electronic message repository.

In one embodiment, a computer-implemented method is disclosed for cloud-based asynchronous communication, the method comprising: receiving a mailbox subscription request from an actor for messages from a PIN pad, receiving a transaction result message from the PIN pad, storing the transaction result message in a mailbox, receiving a message retrieval request from the actor for the transaction result message, transmitting the transaction result message to the actor, receiving a mailbox flush notification from the actor, and flushing the mailbox.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to communication between components of an electronic transaction processing system.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

A merchant payment processing system may typically include one or more point of sale (POS) terminals in communication with one or more personal identification number (PIN) pads. Once a customer's transaction entered at the POS device is ready for completion, the POS device may send messages through the merchant's transaction processing system to a PIN pad. This interaction may include presentation of payment credentials, such as a payment vehicle, and entry of customer identification, such as a PIN, biometric information, etc. The PIN pad and other components of the transaction processing system may communicate by way of communications protocols and APIs specific to each component.

Desirably, in order to allow a flexible communication between a PIN pad, a POS device and other components, such communications may be processed by an intermediary process to transmit messages among the components. For example, the merchant's payment processing system may include a central electronic message repository or "post office" that may operate on a common communications protocol and allow asynchronous communications between components. Thus, each component may avoid direct synchronous communication with other components, thus reducing waste due to idle resources and errors resulting from mismatched message/response pairs.

Figure 7:
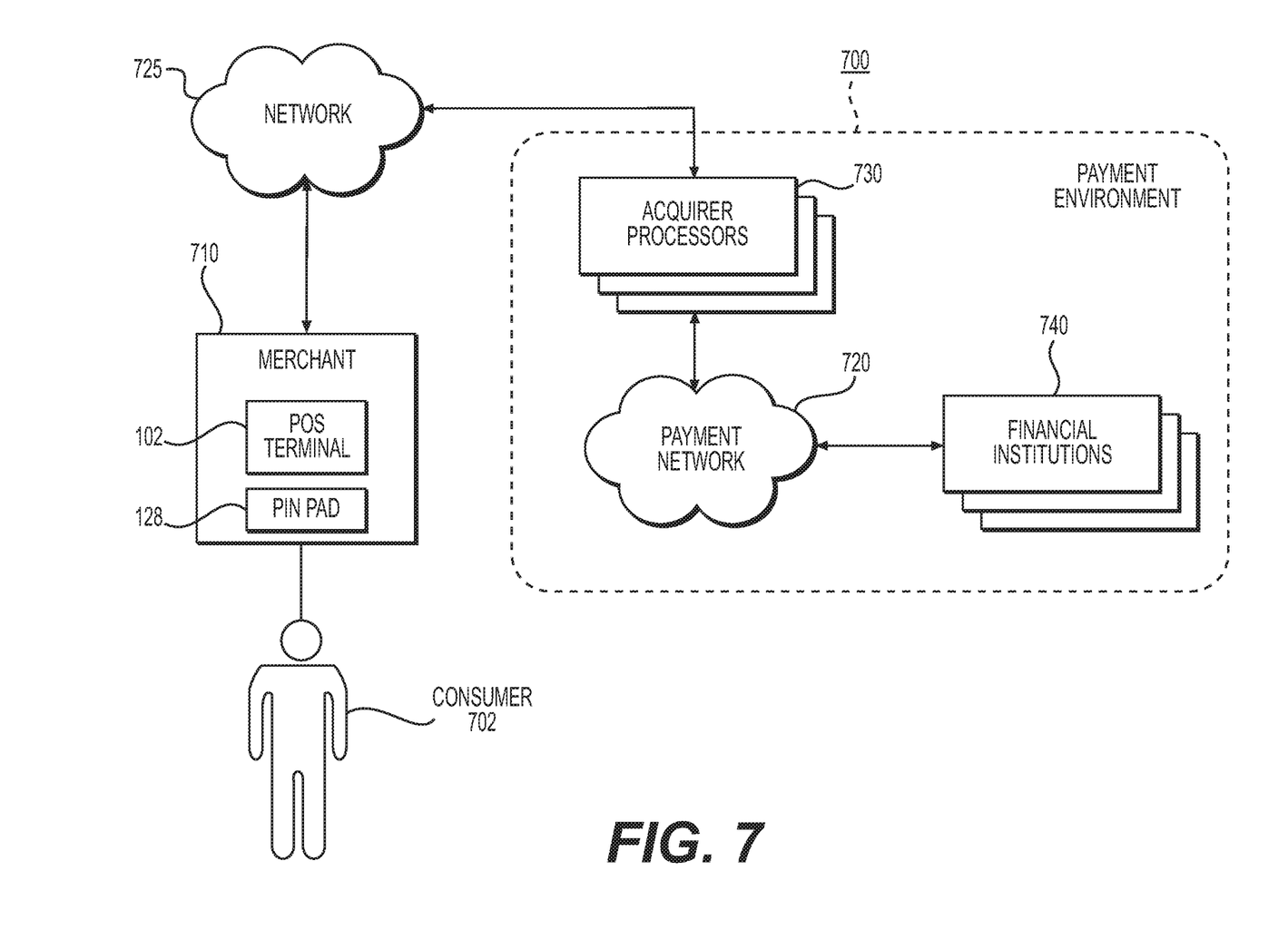
FIG. 7 depicts a block diagram of an electronic payment processing system.

As shown in FIG. 7, in an electronic payment processing system, a consumer 702, during the checkout process with a merchant 710, pays for goods or services from merchant 710 through POS terminal 102, such as, for example, at a PIN pad 128 associated with POS terminal 102. Consumer 702 may use a payment card as payment and the transaction is processed through a payment environment 700. Because merchant 710 generally can use a different bank or financial institution 740 than consumer 702, an acquirer processor 730 handles the financial transactions that transfer payment between the financial institution 740 of consumer 702 and that of merchant 710. If required, consumer 702 may submit payment information at the PIN pad 128 associated with POS terminal 102 of merchant 710, such as by swiping his or her payment card, inserting his or her chip-based payment card, through wireless near field communication (NFC), etc., or by any other suitable means. Merchant 710 sends a payment request by way of a computer network 725 to an acquirer processor 730. Such a payment request maybe sent by PIN pad 128 or POS terminal 102.

Figure 1:
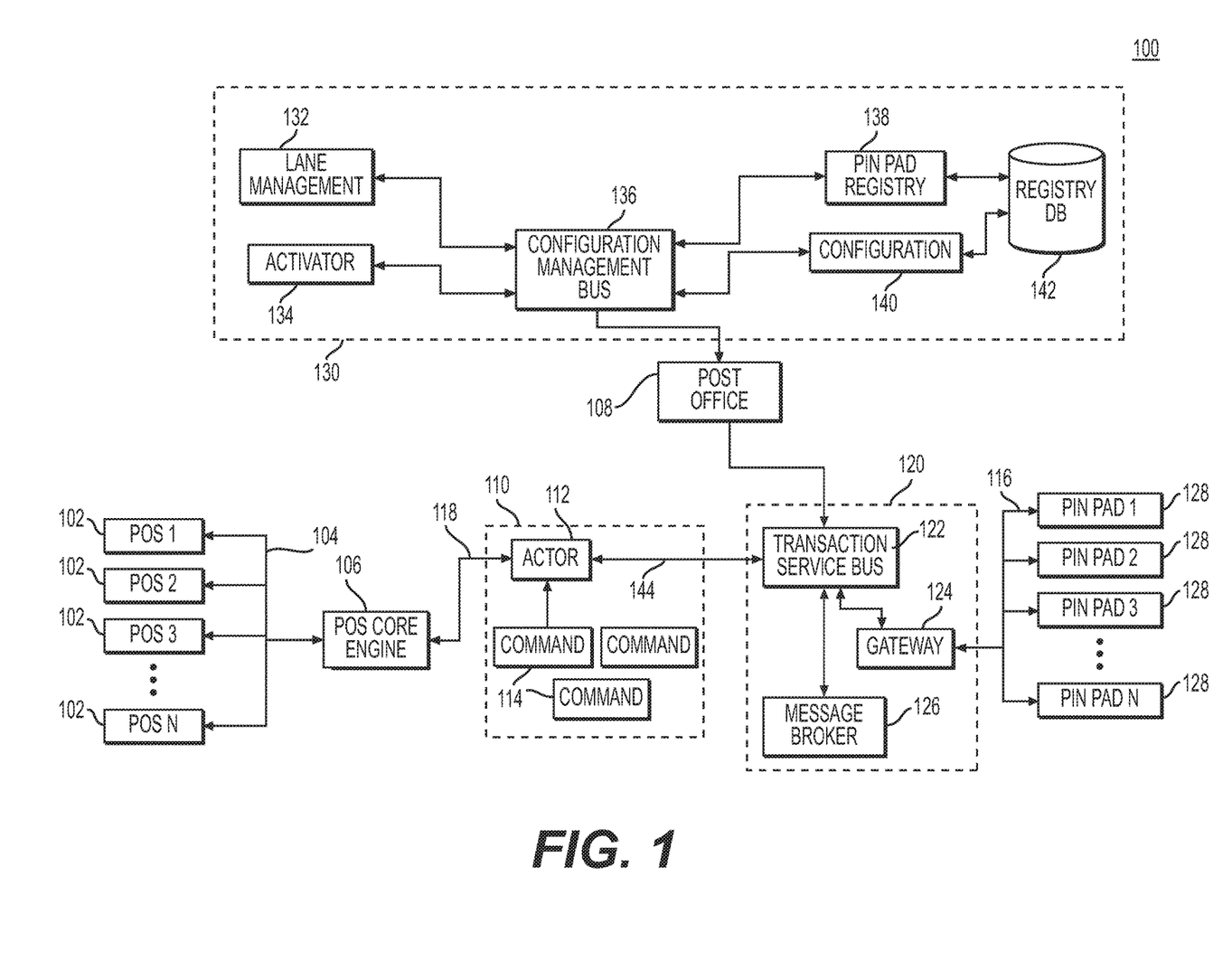
FIG. 1 depicts a block diagram of an electronic payment processing system.

Alternatively, such a request may be sent by a component that controls a flow of a transaction, such as point of sale (POS) engine 106 depicted in FIG. 1. Acquirer processor 730 requests, by way of payment network 720, an electronic transfer of funds from the received funds to the financial institution 740 associated with merchant 710.

Figure 2:
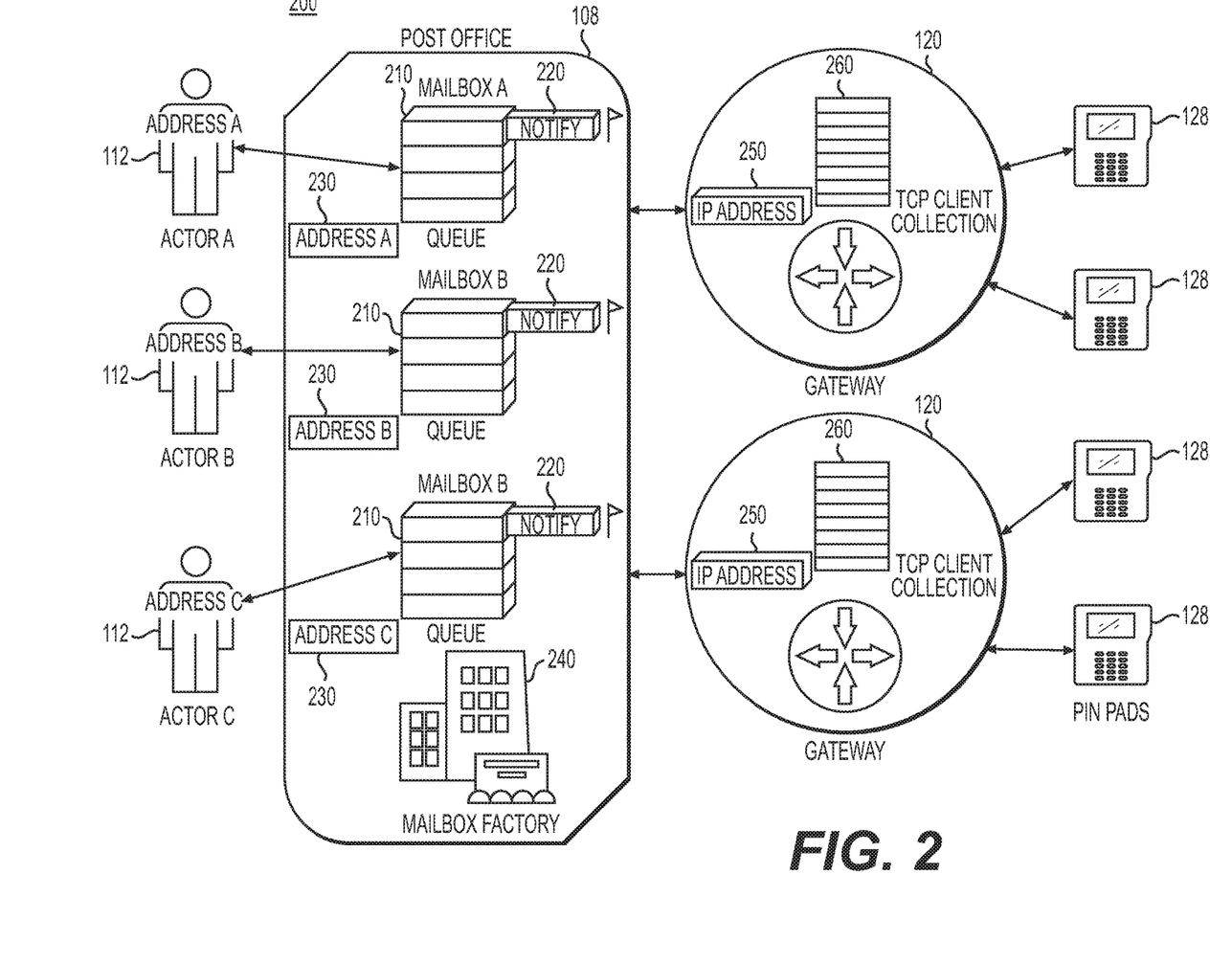
FIG. 2 depicts an exemplary system infrastructure for cloud-based asynchronous communication, according to one or more embodiments.

Merchant 710 may provide an infrastructure for processing electronic payment requests. FIGS. 1 and 2 depict an exemplary system infrastructure for payment processing within a merchant environment, according to one or more embodiments.

As shown in FIG. 1, an infrastructure 100 for processing electronic payment requests may include one or more point of sale (POS) devices 102, which may be in communication with a POS engine 106, and one or more personal identification number (PIN) pad terminals 128, which may be in communication with a socket gateway 124. POS devices 102 may communicate a sale request message over computer network 104 to POS engine 106. POS engine 106 may be embodied, for example, as middleware that may transmit commands to control a PIN pad 128, such as by sending a payment request to PIN pad transaction generator 110 over computer network 118. PIN pad transaction generator 110 may generate one or more PIN pad commands 114 for processing by a transaction actor 112. Transaction actor 112 may take in a transaction request from the POS engine 106 and PIN pad specific commands 114 for the transaction. Transaction actor 112 may further take in expected responses from PIN pad 128. Transaction actor 112 may manage the entire transaction using, for example, a state machine for the specific transaction.

Infrastructure 100 for processing electronic payment requests may further include a PIN pad device gateway 120, which may provide commination with PIN pad terminals 128. PIN pad device gateway 120 may include a message broker that may process incoming sales transaction messages, a transaction service bus topic 122, and one or more device gateways 124. PIN pad device gateway 120 will be described in greater detail below with respect to FIG. 2.

As shown in FIG. 1, infrastructure 100 may further include a configuration management service 130, which may provide configuration services for PIN pad terminals 128. Configuration management service 130 may include a configuration service 140, a PIN pad registry 138 and a PIN pad database 142. Configuration service 140 may, if necessary, configure the PIN pad upon connection of the PIN pad to the infrastructure. PIN pad registry 138 and PIN pad database 142 may maintain data associating each PIN pad with an account or merchant. Configuration management service 130 may further include a lane management service 132 and a PIN Pad activator 134.

Infrastructure 100 may be embodied as a semi-integrated solution and may further control the PIN pad on behalf of the POS device software. Such control may include controlling a transaction flow or sequence including, for example, prompting for payment card swipe or insert, sending a transaction request for authorization, prompting for a consumer signature, etc.

Turning to FIG. 2, a system infrastructure 200 for cloud-based asynchronous communication may be provided for communication between multiple components or services. As shown in FIG. 2, system infrastructure 200 may include post office 108 to facilitate the delivery of transaction processing messages to and from PIN pads 128. Message delivery may be provided asynchronously through post office 108. As discussed above, each PIN pad 128 may connect to other components of infrastructure 100 by way of a gateway 120. There may be multiple gateways 120 provided within system infrastructure 200. Each gateway 120 may include a collection 260 of TCP clients and an IP address 250. IP address 250 may be unique to gateway 120. When a TCP client is created for PIN pad 128, the TCP client may be associated with gateway 120 and may be added to TCP client collection 260. TCP client collection 260 may store, for example, a TCP socket ID for each associated PIN pad 128. PIN pad 128 may also be assigned a unique PIN pad ID. Subsequent communication with PIN pad 128 may be managed through the TCP client and gateway 120.

Upon the creation of a TCP client associated with PIN pad 128, and the association of PIN pad 128 with gateway 120, mailbox factory 240 of post office 108 may create a mailbox 210. Mailbox 210 may be uniquely associated with PIN pad 128 and may serve as a repository and transmission mechanism for messages transmitted to or from PIN pad 128. Mailbox 210 may also be assigned to an actor 112 associated with PIN pad 128. Mailbox 210 may also be uniquely associated with actor 112. As discussed above, actor 112 may serve as a connection between POS engine 106 and PIN pad 128, and may transmit transaction request messages and transaction processing result messages between POS engine 106 and PIN pad 128 by way of mailbox 210.

Mailbox 210 may include a message queue 215 to store messages to be transmitted to or from PIN pad 128. When a message to be transmitted to PIN pad 128 is transmitted to mailbox 210 by actor 112, mailbox 210 may store the message in message queue 215 and may notify gateway 120 of the stored message. For example, gateway 120 may subscribe to incoming message events for messages directed to PIN pad 128. When mailbox 210 stores the message directed to PIN pad 128 in message queue 215, mailbox 210 may send a notification to gateway 210. Notification may be by way of notification flag 220 of mailbox 210. Gateway 120 may then retrieve the message to be delivered to PIN pad 128. Similarly, when a message to be transmitted from PIN pad 128 is transmitted to mailbox 210 by gateway 120, mailbox 210 may store the message in message queue 215 and may notify actor 112 of the stored message. For example, actor 112 may subscribe to outgoing message events for messages sent by PIN pad 128. When mailbox 210 stores the message sent by PIN pad 128 in message queue 215, mailbox 210 may send a notification to actor 112. Notification may be by way of notification flag 220 of mailbox 210. Actor 112 may then retrieve the message to be delivered to a cloud-based application, such as POS 102.

Actor 112 may manage the transmission of messages between cloud-based applications, such as POS 102 and PIN pad 128, to ensure that messages are delivered in sync with the processing of transaction requests. Such management may include ensuring that messages are delivered in sync with the transaction request process flow. For example, actor 112 may maintain a current state of the transaction corresponding to each step in a transaction request process flow. Each state of the transaction process may be associated with one or more message types that may be sent to or from PIN pad 128. If a message is received that does not correspond to the current state of the transaction request process flow, the message may be kept in mailbox 210 until the current state of the transaction request process flow matches the message type of the stored message. Mailbox 210 may notify actor 112 of any messages that have not been consumed periodically until the current transaction has been completed. When the current state of the transaction request process flow matches the message type of a stored message, the message may be retrieved by actor 112 and delivered to PIN pad 128. At the successful completion of a transaction, it may be determined that any messages remaining in mailbox 210 were not necessary for the transaction to complete successfully. Mailbox 210 may be flushed, so that any remaining messages in mailbox 210 are discarded. For example, actor 112 may determine that the transaction request has been completed and may send a mailbox flush message to mailbox 210, thus causing mailbox 210 to flush mailbox queue 215 of mailbox 210.

Figure 3:
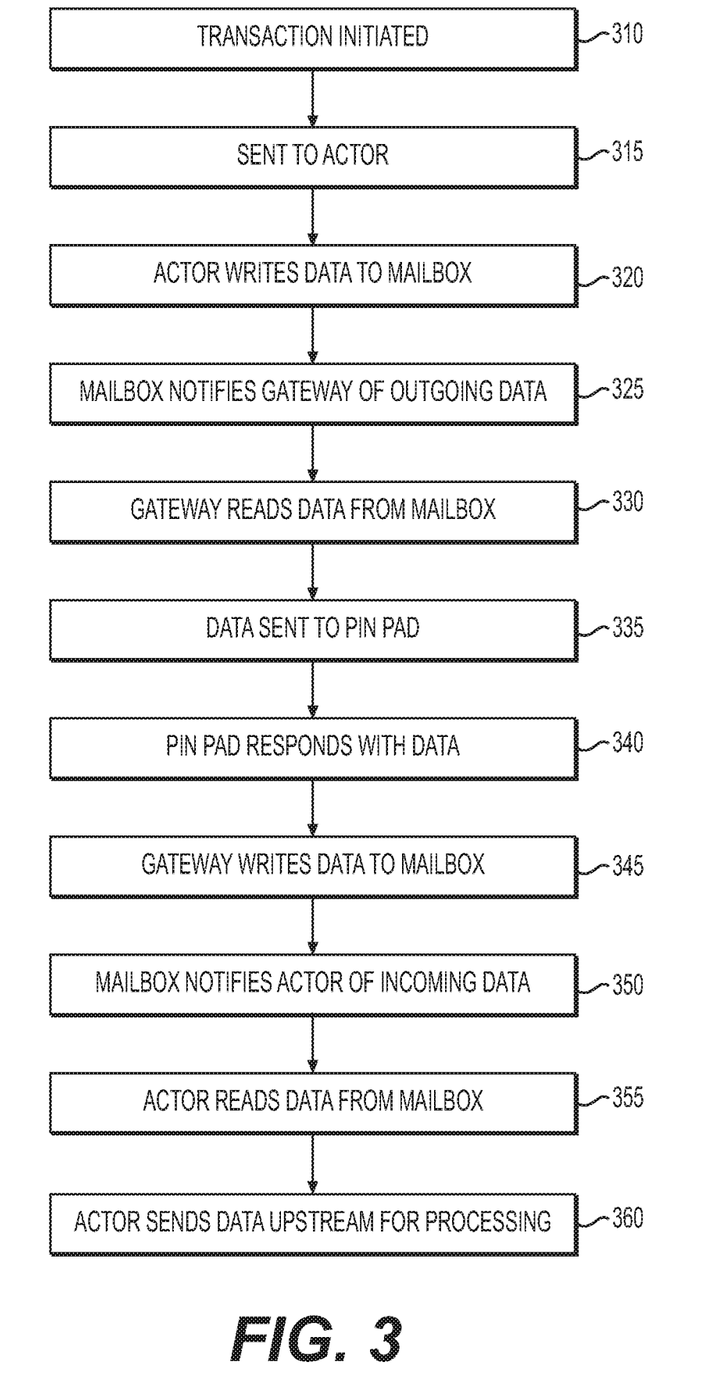
FIG. 3 depicts a process flow diagram of a method of cloud-based asynchronous communication, according to one or more embodiments.

FIG. 3 depicts a process flow diagram of a method of cloud-based asynchronous communication, according to one or more embodiments. As shown in FIG. 3, in operation, 310, a payment transaction may be initiated. In operation, 315, a payment transaction request may be sent to actor 112. In operation, 320, actor 112 may write data pertaining to the payment transaction request to mailbox 210 associated with PIN pad 128. In operation, 325, mailbox 210 may notify gateway 120 associated with PIN pad 128 of outgoing data pertaining to the payment transaction request. In operation, 330, gateway 120 may retrieve the payment transaction request data from mailbox 210. In operation, 335, gateway 120 may send the payment transaction request data sent to PIN pad 128. In operation, 340, PIN pad 128 may respond with payment transaction request response data send to gateway 120. In operation, 345, gateway 120 may write the request response data to mailbox 210. In operation, 350, mailbox 210 may notify actor 112 of incoming payment transaction request response data. In operation, 355, actor 112 may retrieve the payment transaction request response data from mailbox 210. In operation, 360, actor 112 may send the request response data upstream to POS 102 for processing.

Figure 4A:
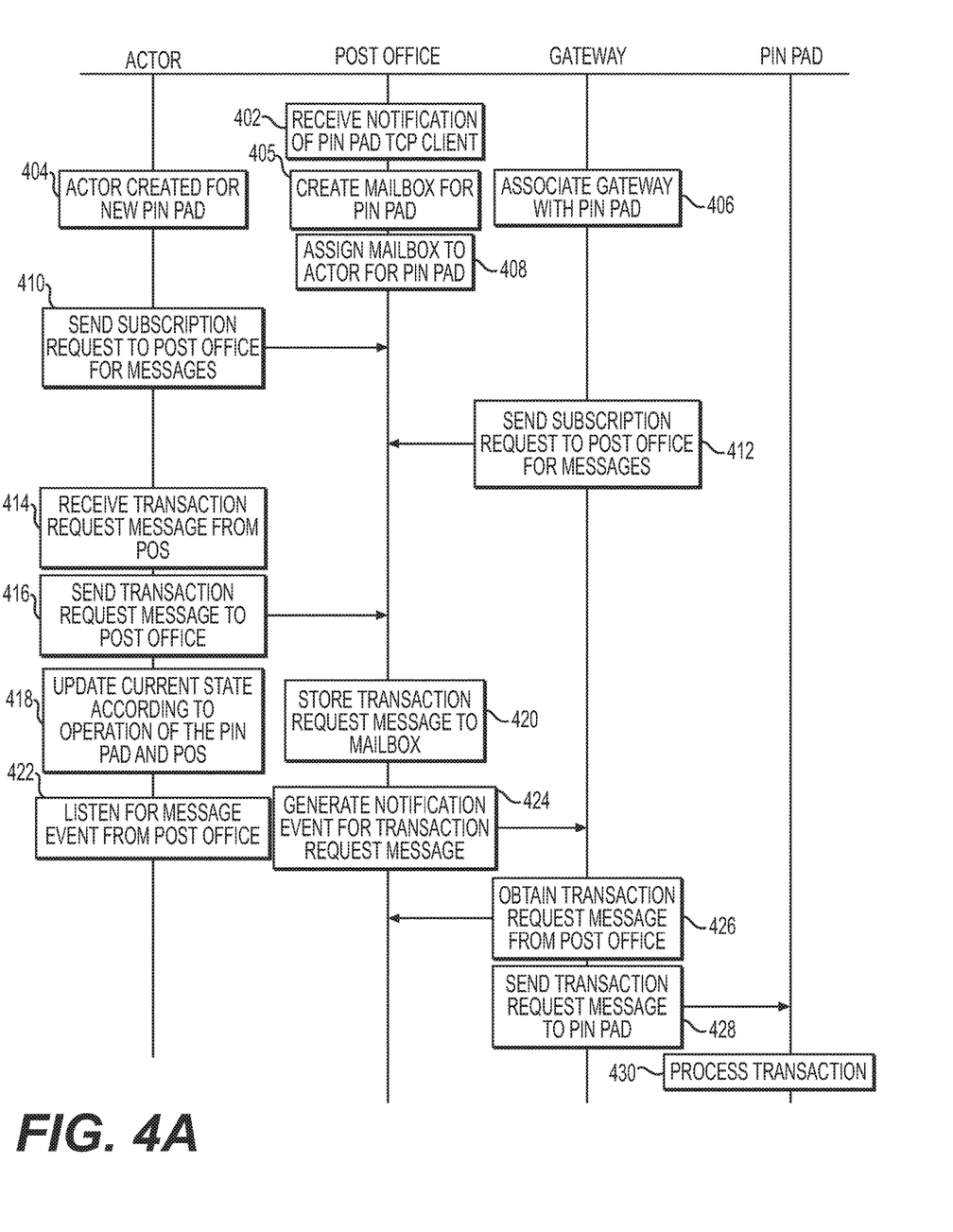
FIGS. 4A and 4B depict a communication flow diagram of a method of cloud-based asynchronous communication, according to one or more embodiments.
Figure 4B:
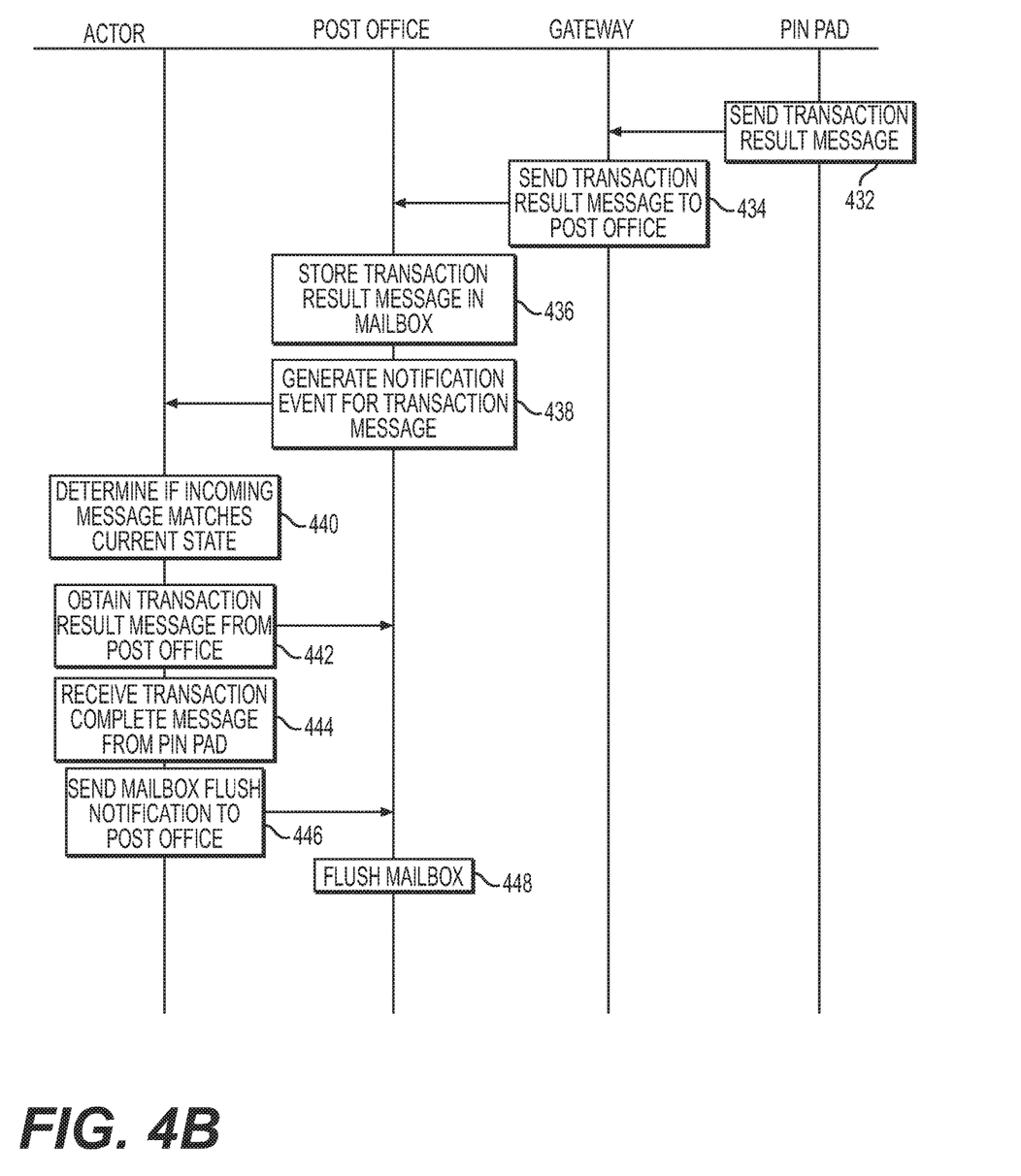

FIGS. 4A and 4B depict a communication flow diagram of a method of cloud-based asynchronous communication, according to one or more embodiments. As shown in FIGS. 4A and 4B, in operation 402, post office 108 may receive a notification that a PIN pad TCP client has been created for PIN pad 128. In operation 404, an actor 112 may be created for new PIN pad 128. In operation 405, mailbox factory 240 of post office 108 may create a mailbox 210 for PIN pad 128. In operation 406, gateway 120 may associate with PIN pad 128. Operations 404, 405, and 406 may be performed in any order or may be performed concurrently. In operation 408, post office 108 may assign mailbox 210 to actor 112 associated with PIN pad 128. In operation 410, actor 112 may send a subscription request to post office 108 for incoming messages from PIN pad 128. In operation 412, gateway 120 may send a subscription request to post office 108 for outgoing messages addressed to PIN pad 128. In operation 414, actor 112 may receive a transaction request message from POS 102. In operation 416, actor 112 may send the transaction request message to post office 108. In operation 418, actor 112 may update a current state of the transaction request according to operation of PIN pad 128 and POS 102. In operation 420, post office 108 may store the transaction request message in mailbox queue 215 of mailbox 210. Operations 418 and 420 may be performed in any order or may be performed concurrently. In operation 422, actor 112 may listen for an incoming message event from post office 108. In operation 424, post office 108 may generate a notification event for the newly received outgoing transaction request message. Operations 422 and 424 may be performed in any order or may be performed concurrently. In operation 426, gateway 120 may obtain the transaction request message from post office 108. In operation 428, gateway 120 may send the transaction request message to PIN pad 128. In operation 430, PIN pad 128 may process the transaction request. In operation 432, PIN pad 128 may transmit a transaction result message by way of gateway 120. In operation 434, gateway 120 may send the transaction result message to post office 108. In operation 436, post office 108 may store the incoming transaction result message in mailbox queue 215 of mailbox 210. In operation 438, post office 108 generate a notification event for the transaction result message. In operation 440, actor 112 may determine whether the incoming message matches the current state of the transaction request. If the incoming message matches the current state of the transaction request, then in operation 442, actor 112 may obtain the transaction result message from post office 108 and send the transaction request message to PIN pad 128. In operation 444, actor 112 may receive a transaction complete message from PIN pad 128. After receiving the transaction complete message from PIN pad 128, in operation 446, actor 112 may send a mailbox flush notification to post office 108. In operation 448, post office 108 may flush mailbox message queue 215.

Figure 5:
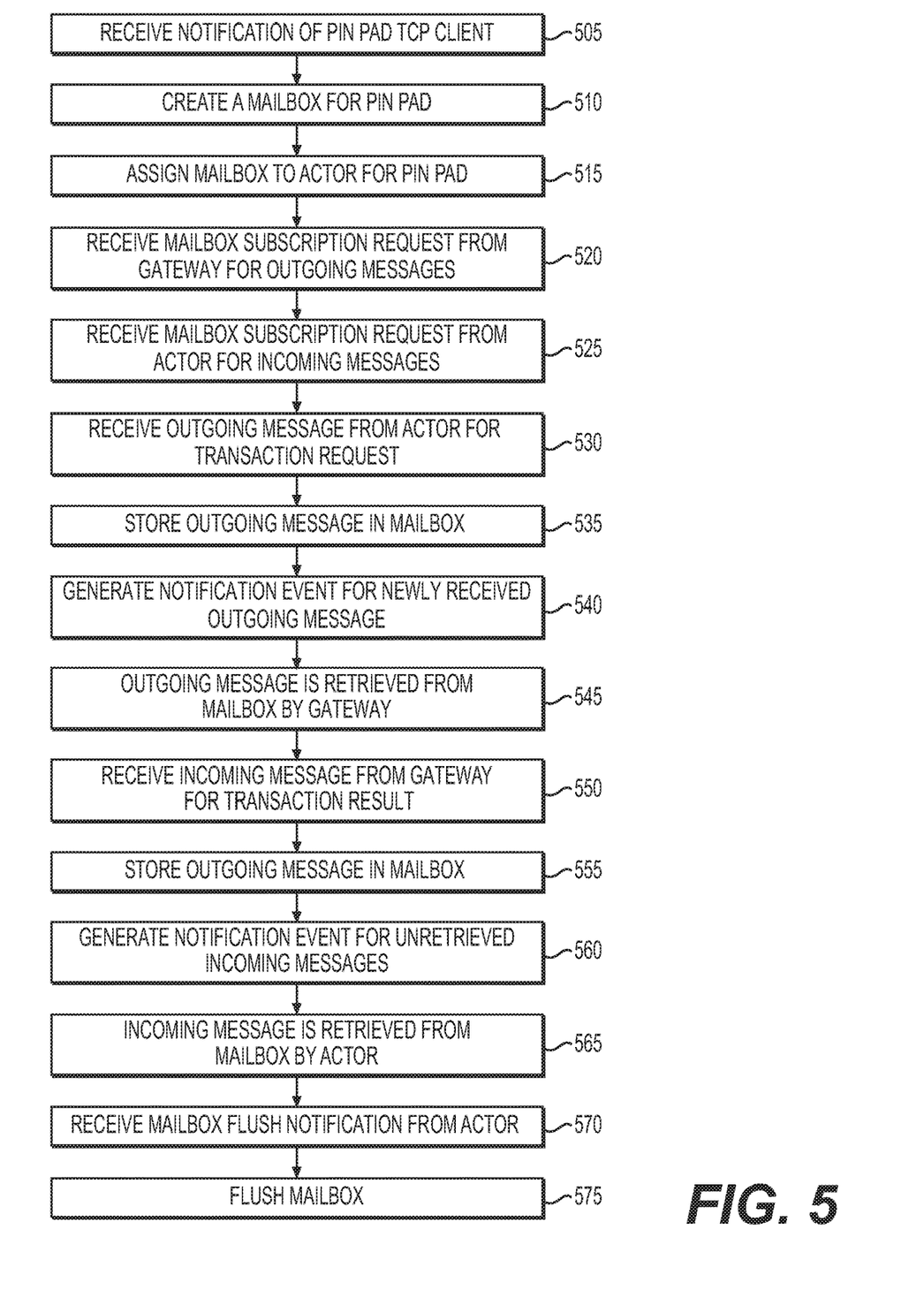
FIG. 5 depicts a flowchart of a method of cloud-based asynchronous communication, according to one or more embodiments.

FIG. 5 depicts a flowchart of a method of cloud-based asynchronous communication, according to one or more embodiments. As shown in FIG. 5, in operation 505, post office 108 may receive a notification that a PIN pad TCP client has been created for PIN pad 128. Upon receiving the notification, post office 108 may, in operation 510, create a mailbox 210 for PIN pad 128. In operation 515, post office 108 may assign mailbox address 230 to actor 112 associated with PIN pad 128. In operation 520, post office 108 may receive a mailbox subscription request from gateway 120 for outgoing messages addressed to PIN pad 128. In operation 525, post office 108 may receive a mailbox subscription request from actor 112 for incoming messages from PIN pad 128. In operation 530, post office 108 may receive an outgoing transaction request message from actor 112 addressed to PIN pad 128. In operation 535, post office 108 may store the outgoing transaction request message in mailbox queue 215 of mailbox 210. In operation 540, post office 108 may generate a notification event for the newly received outgoing transaction request message. In operation 545, post office 108 may deliver the outgoing transaction request message to gateway 120 upon receiving a message retrieval request from gateway 120. In operation 550, post office 108 may receive an incoming transaction result message from gateway 120, the incoming transaction result message originating from PIN pad 128. In operation 555, post office 108 may store the incoming transaction result message in mailbox queue 215 of mailbox 210. In operation 560, post office 108 may generate a notification event for unretrieved incoming messages in mailbox queue 215. In operation 565, post office 108 may deliver the incoming message to actor 112 upon receiving a message retrieval request from actor 112. In operation 570, post office 108 may receive a mailbox flush notification from actor 112. In operation 575, post office 108 may flush mailbox message queue 215.

Figure 6:
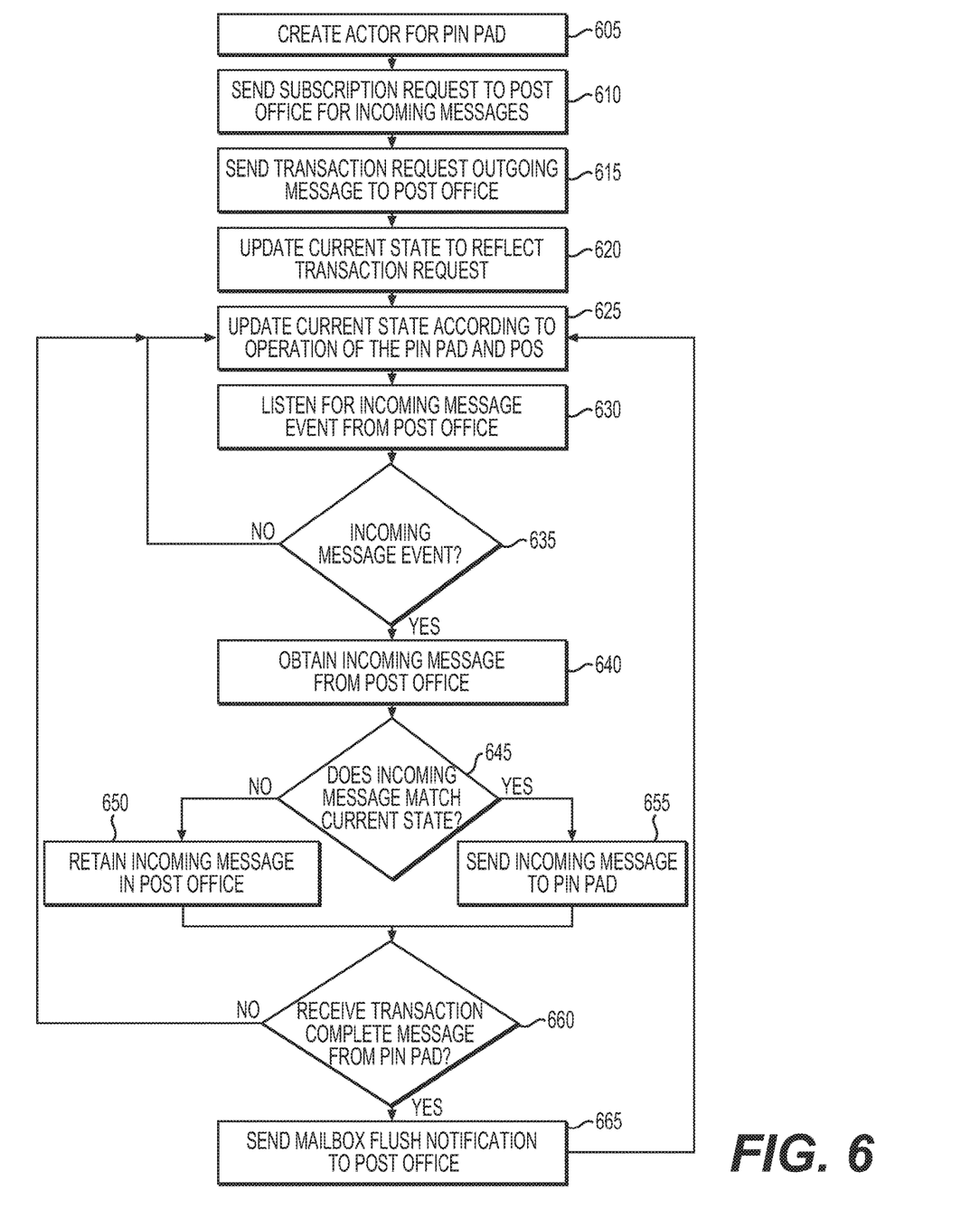
FIG. 6 depicts a flowchart of a method of cloud-based asynchronous communication, according to one or more embodiments.

FIG. 6 depicts a flowchart of a method of cloud-based asynchronous communication, according to one or more embodiments. As shown in FIG. 6, in operation 605, actor 112 may be created for PIN pad 128. In operation 610, actor 112 may send a subscription request to post office 108 for incoming transaction request messages. In operation 615, actor 112 may send the transaction request message to post office 108. In operation 620, actor 112 may update a current state of the transaction to reflect the received transaction request. In operation 625, actor 112 may update the current state of the transaction according to operations performed by PIN pad 128 and POS 102. In operation 630, actor 112 may listen for an incoming message event from post office 108. In operation 635, actor 112 may detect an incoming message event. if actor 112 detects an incoming message event, then in operation 640 actor 112 may obtain the incoming message from post office 108. In operation 645, actor 112 may determine whether the incoming message matches the current state of the transaction request. If the incoming message does not match the current state of the transaction request, then in operation 650 actor 112 may retain the transaction request message in post office 108. If the incoming message matches the current state of the transaction request, then in operation 655 actor 112 may send the transaction request message to PIN pad 128. In operation 660, actor 112 may determine whether a transaction complete message has been received from PIN pad 128. If a transaction complete message has not been received from PIN pad 128, then actor 112 may return to operation 625. If a transaction complete message has been received from PIN pad 128, then in operation 665, actor 112 may send a mailbox flush notification to post office 108 and return to operation 625.

Any suitable system infrastructure may be put into place to provide a cloud based device gateway. FIGS. 1, 2, and 6 and the following discussion provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIGS. 1, 2 and 6. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Figure 8:
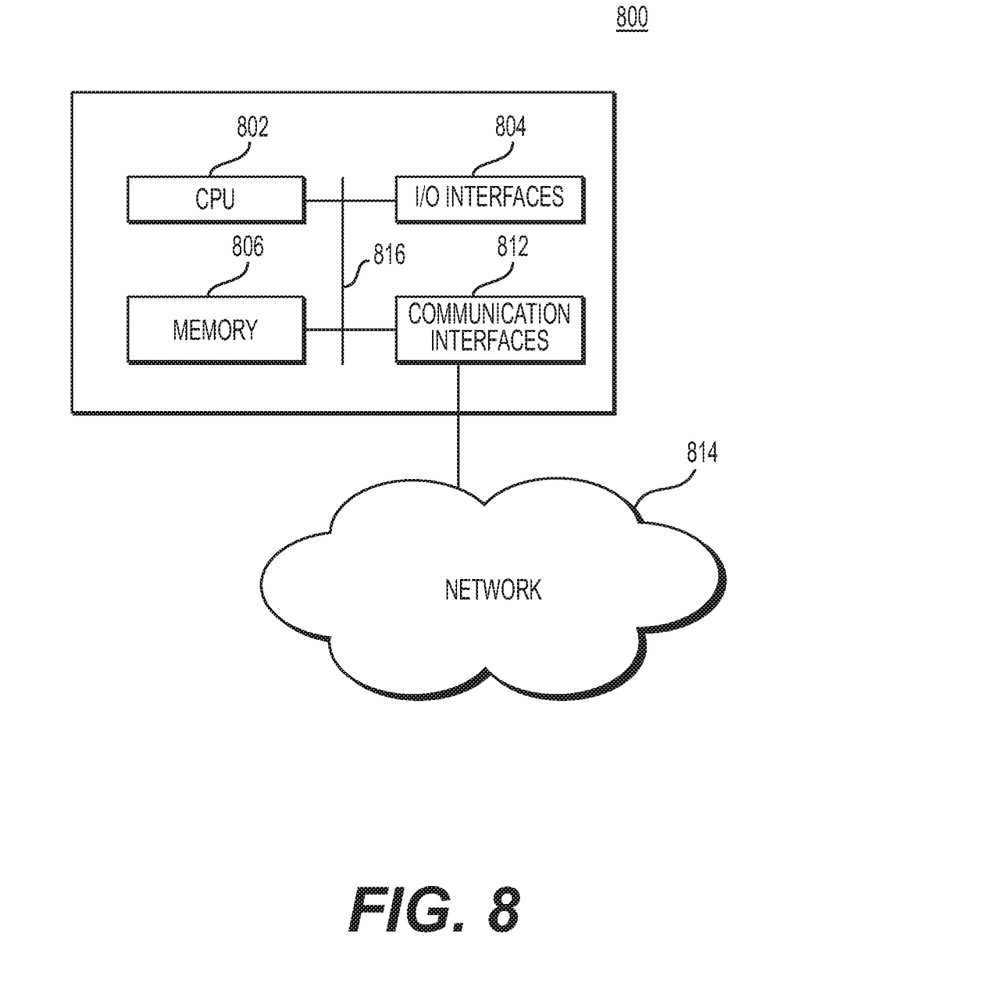
FIG. 8 is a block diagram of an example computing environment, according to one or more embodiments.

The systems and processes described above may be performed on or between one or more computing devices. FIG. 8 illustrates an example computing device. A computing device 800 may be a server, a computing device that is integrated with other systems or subsystems, a mobile computing device such as a smart phone, a cloud-based computing ability, and so forth. The computing device 800 may be any suitable computing device as would be understood in the art, including without limitation, a custom chip, and embedded processing device, a tablet computing device, a POS terminal associated with the merchant 110, a back-office system of a merchant 110, a personal data assistant (PDA), a desktop, laptop, microcomputer, and minicomputer, a server, a mainframe, or any other suitable programmable device. In various embodiments disclosed herein, a single component may be replaced by multiple components and multiple components may be replaced by single component to perform a given function or functions. Except where such substitution would not be operative, such substitution is within the intended scope of the embodiments.

The computing device 800 includes a processor 802 that may be any suitable type of processing unit, for example a general-purpose central processing unit (CPU), a reduced instruction set computer (RISC), a processor that has a pipeline or multiple processing capability including having multiple cores, a complex instruction set computer (CISC), a digital signal processor (DSP), application specific integrated circuits (ASIC), a programmable logic devices (PLD), and a field programmable gate array (FPGA), among others. The computing resources may also include distributed computing devices, cloud computing resources, and virtual computing resources in general.

The computing device 800 also includes one or more memories 806, for example read-only memory (ROM), random access memory (RAM), cache memory associated with the processor 802, or other memory such as dynamic RAM (DRAM), static RAM (SRAM), programmable ROM (PROM), electrically erasable PROM (EEPROM), flash memory, a removable memory card or disc, a solid-state drive, and so forth. The computing device 800 also includes storage media such as a storage device that may be configured to have multiple modules, such as magnetic disk drives, floppy drives, tape drives, hard drives, optical drives and media, magneto-optical drives and media, compact disk drives, Compact Disc Read Only Memory (CD-ROM), compact disc recordable (CD-R), Compact Disk Rewritable (CD-RW), a suitable type of Digital Versatile Disc (DVD) or BluRay disc, and so forth. Storage media such as flash drives, solid-state hard drives, redundant array of individual discs (RAID), virtual drives, networked drives and other memory means including storage media on the processor 802, or memories 806 are also contemplated as storage devices. It may be appreciated that such memory may be internal or external with respect to operation of the disclosed embodiments. It may be appreciated that certain portions of the processes described herein may be performed using instructions stored on a computer readable medium or media that direct computer system to perform the process steps. Non-transitory computable-readable media, as used herein, comprises all computer-readable media except for transitory, propagating signals.

Networking communication interfaces 808 may be configured to transmit to, or receive data from, other computing devices 800 across a network 812. The network and communication interfaces 808 may be an Ethernet interface, a radio interface, a Universal Serial Bus (USB) interface, or any other suitable communications interface and may include receivers, transmitter, and transceivers. For purposes of clarity, a transceiver may be referred to as a receiver or a transmitter when referring to only the input or only the output functionality of the transceiver. Example communication interfaces 808 may include wire data transmission links such as Ethernet and TCP/IP. The communication interfaces 808 may include wireless protocols for interfacing with private or public networks 812. For example, the network and communication interfaces 808 and protocols may include interfaces for communicating with private wireless networks such as Wi-Fi network, one of the IEEE 802.11x family of networks, or another suitable wireless network. The network and communication interfaces 808 may include interfaces and protocols for communicating with public wireless networks 808, using for example wireless protocols used by cellular network providers, including Code Division Multiple Access (CDMA) and Global System for Mobile Communications (GSM). A computing device 800 may use network and communication interfaces 808 to communicate with hardware modules such as a database or data store, or one or more servers or other networked computing resources. Data may be encrypted or protected from unauthorized access.

In various configurations, the computing device 800 may include a system bus 810 for interconnecting the various components of the computing device 800, or the computing device 800 may be integrated into one or more chips such as programmable logic device or application specific integrated circuit (ASIC). The system bus 810 may include a memory controller, a local bus, or a peripheral bus for supporting input and output devices 804, and communication interfaces 808. Example input and output devices 804 include keyboards, keypads, gesture or graphical input devices, motion input devices, touchscreen interfaces, one or more displays, audio units, voice recognition units, vibratory devices, computer mice, and any other suitable user interface.

The processor 802 and memory 806 may include non-volatile memory for storing computable-readable instructions, data, data structures, program modules, code, microcode, and other software components for storing the computer-readable instructions in non-transitory computable-readable mediums in connection with the other hardware components for carrying out the methodologies described herein. Software components may include source code, compiled code, interpreted code, executable code, static code, dynamic code, encrypted code, or any other suitable type of code or computer instructions implemented using any suitable high-level, low-level, object-oriented, visual, compiled, or interpreted programming language.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:
1. A computer-implemented method for cloud-based asynchronous communication, the method comprising:
receiving a transaction request message from a cloud-based application;
sending the received transaction request message to a PIN pad by way of an electronic message repository;

updating a current step in a transaction request process flow of the received transaction request;

listening for a new incoming message event from the electronic message repository;

receiving a new incoming message event from the electronic message repository, and retrieving an incoming message from the electronic message repository;

determining whether a message type of the retrieved incoming message matches the current step in the transaction request process flow of the received transaction request; and upon determining that the message type of the retrieved incoming message does not match the current step in the transaction request process flow of the received transaction request, retaining the retrieved incoming message in the electronic message repository.

2. The computer-implemented method of claim 1, further comprising:

sending a subscription request to the electronic message repository for messages generated by the PIN pad.

3. The computer-implemented method of claim 1, further comprising:

receiving a transaction status message from the cloud-based application; and updating the current step in the transaction request process flow of the received transaction request according to the received transaction status message.

4. The computer-implemented method of claim 1, further comprising:

receiving a transaction complete message from the PIN pad; and sending a mailbox flush notification to the electronic message repository.

5. The computer-implemented method of claim 1, wherein the cloud-based application is a point of sale (POS) application.

6. The computer-implemented method of claim 1, wherein the current step in the transaction request process flow of the received transaction request is associated with one or more message types of messages sent to or from the PIN pad.

7. The computer-implemented method of claim 1, further comprising:

receiving a notification from the electronic message repository of past unretrieved messages stored in the electronic message repository.

8. A non-transitory machine-readable medium storing instructions that, when executed by a computing system, causes the computing system to perform a method for cloud-based asynchronous communication, the method including:

receiving a transaction request message from a cloud-based application;

sending the received transaction request message to a PIN pad by way of an electronic message repository;

updating a current step in a transaction request process flow of the received transaction request the received transaction request;

listening for a new incoming message event from the electronic message repository;

receiving a new incoming message event from the electronic message repository, and retrieving an incoming message from the electronic message repository;

determining whether a message type of the retrieved incoming message matches the current step in the transaction request process flow of the received transaction request;

upon determining that the message type of the retrieved incoming message matches the current step in the transaction request process flow of the received transaction request, transmitting the retrieved incoming message to the cloud-based application; and upon determining that the message type of the retrieved incoming message does not match the current step in the transaction request process flow of the received transaction request, retaining the retrieved incoming message in the electronic message repository.

9. The non-transitory machine-readable medium of claim 8, the method further comprising:

sending a subscription request to the electronic message repository for messages generated by the PIN pad.

10. The non-transitory machine-readable medium of claim 8, the method further comprising:

receiving a transaction status message from the cloud-based application; and updating the current step in the transaction request process flow of the received transaction request according to the received transaction status message.

11. The non-transitory machine-readable medium of claim 8, the method further comprising:

receiving a transaction complete message from the PIN pad; and sending a mailbox flush notification to the electronic message repository.

12. The non-transitory machine-readable medium of claim 8, wherein the cloud-based application is a point of sale (POS) application.

13. The non-transitory machine-readable medium of claim 8, wherein the current step in the transaction request process flow of the received transaction request is associated with one or more message types of messages sent to or from the PIN pad.

14. The non-transitory machine-readable medium of claim 8, the method further comprising:

receiving a notification from the electronic message repository of past unretrieved messages stored in the electronic message repository.

* * * * *